US007928691B2

(12) United States Patent
Studyvin et al.

(10) Patent No.: US 7,928,691 B2
(45) Date of Patent: Apr. 19, 2011

(54) METHOD AND SYSTEM FOR CELL EQUALIZATION WITH ISOLATED CHARGING SOURCES

(75) Inventors: William B Studyvin, Cherokee, KS (US); Eric Coatney, Bronaugh, MO (US); Tim Pennock, Webb City, MO (US); Phillip Shimp, Diamond, MO (US); Greg Miller, Diamond, MO (US)

(73) Assignee: EaglePicher Technologies, Joplin, MO (US)

( * ) Notice: Subject to any disclaimer, the term of this patent is extended or adjusted under 35 U.S.C. 154(b) by 0 days.

(21) Appl. No.: 11/163,668

(22) Filed: Oct. 26, 2005

(65) Prior Publication Data

US 2006/0097696 A1   May 11, 2006

Related U.S. Application Data

(60) Provisional application No. 60/522,815, filed on Nov. 10, 2004.

(51) Int. Cl.
*H02J 7/00* (2006.01)
(52) U.S. Cl. ........ 320/116; 320/120; 320/134; 320/138; 702/63; 307/43; 307/82
(58) Field of Classification Search .......... 320/116, 320/119, 120, 124, 130, 134, 122, 138, 140, 320/132; 702/63; 307/71, 80, 81, 85, 43, 307/82; 324/132, 134
See application file for complete search history.

(56) References Cited

U.S. PATENT DOCUMENTS

| 4,238,721 | A | * | 12/1980 | DeLuca et al. ............. 320/122 |
| 4,467,266 | A | | 8/1984 | Ritchie |
| 5,498,950 | A | * | 3/1996 | Ouwerkerk .................. 320/119 |
| 5,504,415 | A | | 4/1996 | Podrazhansky et al. |
| 5,592,067 | A | | 1/1997 | Peter et al. |
| 5,631,534 | A | | 5/1997 | Lewis |
| 5,656,915 | A | | 8/1997 | Eaves |
| 5,659,208 | A | * | 8/1997 | Kimble et al. ................. 307/82 |
| 5,710,504 | A | | 1/1998 | Pascual et al. |
| 5,811,959 | A | * | 9/1998 | Kejha ............................ 320/126 |
| 5,821,733 | A | | 10/1998 | Turnbull |
| 5,850,136 | A | * | 12/1998 | Kaneko ......................... 320/119 |

(Continued)

FOREIGN PATENT DOCUMENTS
JP        08237861        9/1996

OTHER PUBLICATIONS

Non-final Office Action for U.S. Appl. No. 11/163,667 dated Jul. 25, 2008.

(Continued)

*Primary Examiner* — Edward Tso
*Assistant Examiner* — Arun Williams
(74) *Attorney, Agent, or Firm* — Armstrong Teasdale LLP (57) ABSTRACT

A system and method for charging a rechargeable, or secondary, battery including a series string of battery cells, a topology of charging sources that selectively provides charging current to battery cells that need to be charged, but avoids overcharging battery cells that are already charged above a predetermined voltage threshold. Based on individual cell voltage measurements, the charging current is controlled in a manner to direct charging current to the battery cell(s) needing charge until these cells are fully charged, and bypasses battery cells that are fully charged or become fully charged.

14 Claims, 6 Drawing Sheets

U.S. PATENT DOCUMENTS

| | | |
|---|---|---|
| 5,867,007 A | 2/1999 | Kim |
| 5,920,179 A | 7/1999 | Pedicini |
| 5,945,804 A | 8/1999 | Hansson et al. |
| 5,952,815 A | 9/1999 | Rouillard et al. |
| 5,965,996 A * | 10/1999 | Arledge et al. ............... 320/116 |
| 6,064,178 A | 5/2000 | Miller |
| 6,094,031 A * | 7/2000 | Shimane et al. ............. 320/118 |
| 6,097,174 A | 8/2000 | Yang |
| 6,140,800 A | 10/2000 | Peterson |
| 6,150,795 A | 11/2000 | Kutkut et al. |
| 6,157,167 A | 12/2000 | Schwartz et al. |
| 6,181,106 B1 | 1/2001 | Finger |
| 6,222,344 B1 | 4/2001 | Peterson et al. |
| 6,268,710 B1 * | 7/2001 | Koga ............................. 320/116 |
| 6,316,917 B1 | 11/2001 | Ohta |
| 6,326,768 B2 | 12/2001 | Nagai et al. |
| 6,377,024 B1 * | 4/2002 | Choy ............................ 320/118 |
| 6,388,424 B1 | 5/2002 | Hidaka et al. |
| 6,441,583 B1 | 8/2002 | Perelle |
| 6,452,363 B1 | 9/2002 | Jabaji |
| 6,580,249 B2 | 6/2003 | Yau et al. |
| 6,580,251 B2 * | 6/2003 | Takeuchi ..................... 320/138 |
| 6,586,917 B1 | 7/2003 | Smith |
| 6,608,470 B1 | 8/2003 | Oglesbee et al. |
| 6,703,722 B2 * | 3/2004 | Christensen .................... 307/71 |
| 6,791,297 B2 | 9/2004 | Ott |
| 6,822,423 B2 | 11/2004 | Yau et al. |
| 6,841,971 B1 | 1/2005 | Spee |
| 6,983,212 B2 * | 1/2006 | Burns ............................. 702/63 |
| 7,061,207 B2 * | 6/2006 | Patel et al. .................... 320/119 |
| 2002/0047685 A1 | 4/2002 | Perelle |
| 2002/0084770 A1 | 7/2002 | Jabaji |
| 2002/0195994 A1 | 12/2002 | Perelle |
| 2003/0042870 A1 | 3/2003 | Yau et al. |
| 2003/0113600 A1 | 6/2003 | Wardrop et al. |
| 2003/0139888 A1 | 7/2003 | Burns |
| 2003/0160593 A1 | 8/2003 | Yau et al. |
| 2003/0218446 A1 | 11/2003 | Beerwerth et al. |
| 2004/0012371 A1 * | 1/2004 | Ott et al. ....................... 320/116 |
| 2004/0135544 A1 * | 7/2004 | King et al. .................... 320/116 |
| 2004/0145346 A1 * | 7/2004 | Hall et al. ..................... 320/116 |
| 2004/0164706 A1 * | 8/2004 | Osborne ....................... 320/116 |
| 2006/0097696 A1 | 5/2006 | Studyvin et al. |
| 2006/0097697 A1 | 5/2006 | Studyvin |
| 2006/0097700 A1 | 5/2006 | Studyvin |
| 2007/0063670 A1 | 3/2007 | Taurand |

OTHER PUBLICATIONS

Final Office Action for U.S. Appl. No. 11/163,667 dated Feb. 6, 2008.
Non-final Office Action for U.S. Appl. No. 11/163,667 dated Sep. 11, 2007.
Non-final Office Action for U.S. Appl. No. 11/163,669 dated Jul. 28, 2008.
Final Office Action for U.S. Appl. No. 11/163,669 dated Feb. 6, 2008.
Non-final Office Action for U.S. Appl. No. 11/163,669 dated Aug. 16, 2007.

* cited by examiner

Control Truth Table

| Permutations | Battery Cell 342 | Battery Cell 344 | Battery Cell 346 | Battery Cell 348 | Charging Source 312 | Charging Source 314 | Charging Source 316 | Charging Source 318 | Charging Operation |
|---|---|---|---|---|---|---|---|---|---|
| 1. | low | low | low | low | On | On | On | On | All battery cells charging |
| 2. | low | low | low | high | On | On | On | Off | Battery cells 312, 314, 316 charging |
| 3. | low | low | high | low | On | On | Off | On | Battery cells 312, 314, 318 charging |
| 4. | low | low | high | high | On | On | Off | Off | Battery cells 312, 314 charging |
| 5. | low | high | low | low | On | Off | On | On | Battery cells 312, 316, 318 charging |
| 6. | low | high | low | high | On | Off | On | Off | Battery cells 312, 316 charging |
| 7. | low | high | high | low | On | Off | Off | On | Battery cells 312, 318 charging |
| 8. | low | high | high | high | On | Off | Off | Off | Battery cell 312 charging |
| 9. | high | low | low | low | Off | On | On | On | Battery cells 314, 316, 318 charging |
| 10. | high | low | low | high | Off | On | On | Off | Battery cells 314, 316 charging |
| 11. | high | low | high | low | Off | On | Off | On | Battery cells 314, 318 charging |
| 12. | high | low | high | high | Off | On | Off | Off | Battery cell 314 charging |
| 13. | high | high | low | low | Off | Off | On | On | Battery cells 316, 318 charging |
| 14. | high | high | low | high | Off | Off | On | Off | Battery cell 316 charging |
| 15. | high | high | high | low | Off | Off | Off | On | Battery cell 318 charging |
| 16. | high | high | high | high | Off | Off | Off | Off | No battery cells charging |

METHOD AND SYSTEM FOR CELL EQUALIZATION WITH ISOLATED CHARGING SOURCES

CROSS-REFERENCE TO RELATED APPLICATIONS

This application claims priority to U.S. Provisional Application No. 60/522,815 filed Nov. 11, 2004, which provisional application, in its entirety, is hereby incorporated by reference.

FIELD OF INVENTION

The invention generally relates to secondary batteries, and more particularly, to cell equalization of such batteries.

BACKGROUND OF INVENTION

Generally, secondary (rechargeable) batteries include a string of individual battery cells connected in series to obtain a higher output voltage level. During charging of secondary batteries, inherent differences in the capacity of the individual battery cells may cause the higher capacity cells to achieve full charge first, and then over-charge while the remaining battery cells continue to charge. Depending on the ability of the battery cell chemistry to tolerate this over-charge, cell damage may occur. During discharge, a similar problem may be encountered when the lower capacity battery cells reach minimum voltages first and over-discharge. Cell chemistries such as lead-acid and nickel-cadmium may tolerate moderate forms of these conditions, while other cell chemistries, such as silver-zinc and lithium-ion, may be more easily damaged. The probability of damage due to over-charge may be further aggravated by demand for rapid charging systems that require higher currents and cell temperatures.

For the reasons stated above, charging a series-connected string of individual battery cells normally poses unique monitoring and control difficulties. For example, measuring the voltage of the battery may not necessarily indicate the condition of each individual cell in the battery. If the individual battery cells are, for example, not well balanced, a cell may experience a damaging over-charge condition even though the battery voltage is within acceptable limits. Thus, each battery cell in a string usually is monitored and controlled to insure that each individual battery cell in the series string does not experience an over-voltage condition during charging.

When charging, secondary battery cells generally are bulk charged if the battery cell voltage is above a specified level. Bulk charging continues until any individual cell voltage reaches an upper voltage limit. At the end of bulk charging, one or more battery cells may, however, be only partially charged, and may not have yet reached a 100% state of charge. The partially charged condition is considered adequate for some applications and, thus, the charging process may be terminated prior to each individual cell being 100% charged. Over time, however, the performance of individual cells in the battery may diverge due to each battery cell being charged to a different level during any one recharge. To minimize divergence, a second step in the charging process often is implemented.

The second step in the charging process is known as "cell equalization." Cell equalization generally begins when a battery cell is "clamped" at an upper voltage limit during charging. The charging current usually decreases because the cell voltage is clamped, and not allowed to increase. To protect against cell failure, safeguards to terminate the charging process prior to cell failure often are usually employed. Cell charging may be terminated (and cell equalization ended) based on a specified cell charge current level (normal condition), a specified over temperature condition (fault condition), and/or a specified cell charge time out (fault condition). At the end of cell equalization, the string of individual battery cells connected in series generally is considered at a 100% state of charge even though each battery cell may not be fully charged.

In addition to overcharging, battery cells may experience damage if the cell temperature falls outside a specific range. Thus, cell temperatures are advantageously kept within a specified temperature range during bulk charging and cell equalization to prevent temperature damage from occurring.

Another concern for battery cells is over-discharge. Over-discharge often causes serious performance degradation and damage the cell. Over-discharge may occur when any cell voltage drops below a fixed voltage level. To prevent over-discharge, secondary batteries often are equipped with a mechanism that terminates discharge when any cell drops below a fixed voltage level. Sometimes, however, the cell voltage may rise after the discharge is terminated, so hysteresis may be necessary to prevent oscillations.

Thus, it is generally recognized that recharging a secondary battery having a series-connected string of cells preferably is accomplished in a manner that charges each battery cell to substantially the same level while avoiding overcharging any of the cells. Thus, there is a need for a cell equalizing charging system that is low-cost, uses simple circuitry, reduces power dissipation during charging, and operates efficiently.

SUMMARY OF INVENTION

A system for charging a secondary battery according to various embodiments of the present invention includes N battery cells connected in a series string, wherein the series string includes a first battery cell located at a load end and a $N^{th}$ battery cell located at a ground end. In one embodiment, two or more charging sources are connected to the series string, wherein each charging source is connected in parallel to a respective battery cell.

In accordance with one exemplary embodiment of the present invention, each charging source is connected to a central charging source. In another embodiment, each charging source is configured to provide charging current to each respective battery cell via a positive path, and provide a charging current return path via a negative path. In yet another embodiment, each charging source is configured to operate in a first (e.g., charging) state and a second (e.g., non-charging) state, wherein when operating in the first state, each charging source provides charging current to a respective battery cell, and when operating in the second state, does not provide charging current to the battery cell.

In one exemplary embodiment, the charging system includes a controller in communication with each charging source. In accordance with an aspect of one exemplary embodiment, the controller selectively controls the operation of each charging source, such that each charging source is operating in the first state or the second state.

In accordance with another exemplary embodiment, the charging system includes one or more cell monitors connected to the series string wherein each cell monitor is configured to measure the voltage of a battery cell connected to each respective cell monitor. The charging system, in accordance with yet another exemplary embodiment, includes a controller connected to each cell monitor and connected to each charging source, wherein each charging source is controlled by the controller to (i) provide charging current to their respective battery cells when the battery cell contains an amount of voltage below a threshold amount, and (ii) not provide charging current to the battery cell when the battery cell contains an amount of voltage above the threshold amount.

A method for equalizing voltage of secondary battery being charged according to various embodiments of the present invention includes the steps of connecting N battery cells in series to form a series string, wherein the connecting step includes connecting one battery cell to a load end, connecting a $N^{th}$ cell to a ground end, and connecting two or more charging sources to the series string, wherein each charging source is connected in parallel to a respective battery cell. In accordance with one exemplary embodiment of the present invention, the method includes configuring the charging sources to selectively provide charging current to one or more of the N battery cells. In accordance with an aspect of one exemplary embodiment of the present invention, the step of configuring the charging sources includes configuring a particular charging source to operate in a first (e.g., charging) state to provide charging current to a respective battery cell, and configuring the particular charging source to operate in a second (e.g., non-charging) state to not provide charging current to the battery cell.

In accordance with another exemplary embodiment, the method includes connecting each charging source to a power source. In accordance with yet another exemplary embodiment, the method includes configuring the charging sources to provide charging current to each cell containing an amount of voltage below a threshold amount, and to not provide charging current to each battery cell containing an amount of voltage above the threshold amount. The method, in accordance with still another exemplary embodiment, includes connecting one or more cell monitors to the series string, wherein each cell monitor is connected to a respective battery cell, configured to monitor the voltage level in the battery cell(s), and determine which battery cell(s) is/are above and/or below the threshold amount.

Another method for equalizing voltage of a secondary battery being charged according to various embodiments of the present invention includes connecting two or more battery cells in series to form a series string, connecting in parallel across each battery cell an associated charging source, charging a particular battery cell with the associated charging source when an amount of voltage in the particular battery cell is below a threshold level, and not charging any battery cell(s) including an amount of voltage above the threshold level. In accordance with an aspect of one exemplary embodiment, the step of charging a particular cell includes switching ON the a respective charging source to charge the associated battery cell, and switching OFF the isolated charging source to avoid charging (or overcharging) its associated battery cell.

The method, in accordance with another exemplary embodiment of the invention, includes monitoring a respective voltage level in each of the battery cells, and independently operating each of the charging sources in an ON state or an OFF state based on the voltage level of an associated battery cell. In accordance with an aspect of one exemplary embodiment of the present invention, charging a particular cell may include the step of providing charging current to the particular battery cell via the associated charging source. In accordance with another aspect of one exemplary embodiment of the present invention, charging a particular cell may include returning the charging current to the associated charging source via a charging current return path (e.g., a ground end).

BRIEF DESCRIPTION OF THE DRAWINGS

A more complete understanding of the present invention may be derived by referring to the detailed description and claims when considered in connection with the drawing figures, where like reference numbers refer to similar elements throughout the figures, and:

DETAILED DESCRIPTION

The detailed description of various exemplary embodiments of the invention herein makes reference to the accompanying figures and drawings. While these exemplary embodiments are described in sufficient detail to enable those skilled in the art to practice the invention, it should be understood that other embodiments may be realized in that logical and mechanical changes may be made without departing from the spirit and scope of the invention. Thus, the detailed description herein is presented for purposes of illustration only and not by way of limitation. For example, the steps recited in any of the method or process descriptions may be executed in any order and are not limited to the order presented.

For the sake of brevity, the apparatus and systems (and components of the individual operating components) are described in detail herein. Furthermore, the connecting lines shown in the various figures contained herein are intended to represent exemplary functional relationships and/or physical couplings between the various elements. It should be noted that many alternative and/or additional functional relationships and/or physical connections may be present in a practical system.

Figure 1:
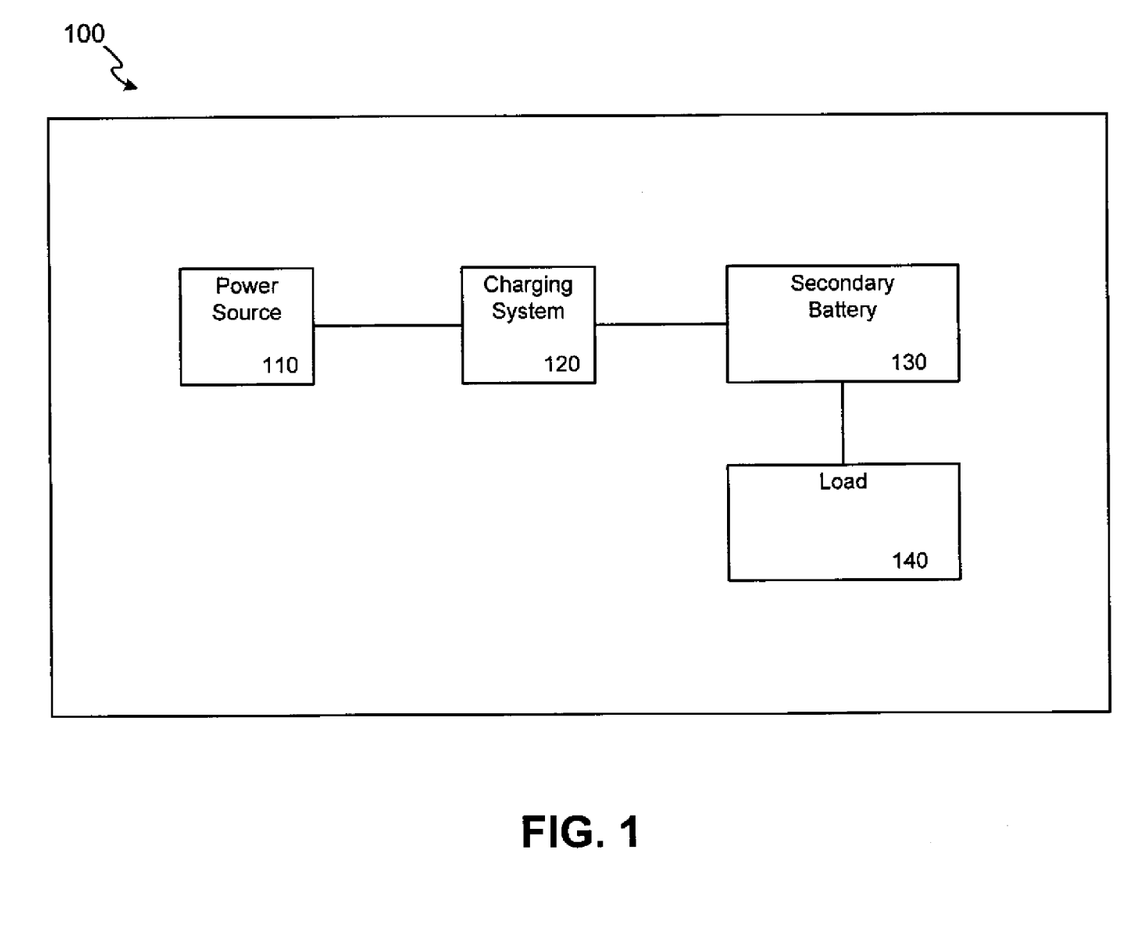
FIG. 1 is a block diagram of one exemplary embodiment of a device including a secondary battery, and a charging system to recharge the secondary battery.

Turning now to the figures, FIG. 1 is a block diagram of one exemplary embodiment of a device 100 including a secondary battery 130 and a charging system 120 to recharge secondary battery 130. Device 100, in one exemplary embodiment, includes a power source 110, which may be a DC power source or an AC power source. In one aspect of an exemplary embodiment of the invention (e.g., when power source 100 is a DC power source), power source 110 may be a solar panel such that power source 100 produces a DC signal. In another aspect of one exemplary embodiment of the invention (e.g., when power source 110 is an AC power source), power source 110 may be a standard AC outlet along with a transformer, or the like, to provide an appropriate voltage signal for charging secondary battery 130. The invention does contemplate, however, that power source 110 may be any DC or AC power source known in the art capable of providing charging current to recharge secondary battery 130.

Device 100, in another exemplary embodiment, includes charging system 120 connected to power source 110. In various exemplary embodiments of the invention, charging system 120 may be suitably configured (as discussed in greater detail below) to charge one or more battery cells (not shown) within secondary battery 130.

In one exemplary embodiment, secondary battery 130 is a lithium-ion battery including one or more battery cells. In other embodiments of the invention, secondary battery 130 may be, but is not limited to, a lead-acid battery, a nickel-cadmium battery, a nickel-metal hydride battery, a nickel hydrogen battery, a silver-zinc battery, or any other battery including one or more battery cells capable of storing a charge and subsequently being recharged after discharge.

Device 100 includes load 140 connected to secondary battery 130, wherein device 100, in an exemplary embodiment, is a device that requires voltage and current. Examples of load 140 may include, but are certainly not limited to, a personal digital assistant (PDA), a BlackBerry® device, a cellular phone, a pager, a Palm Pilot® device, and/or any other electronic or communication device capable of being supplied power by secondary battery 130.

Figure 2:
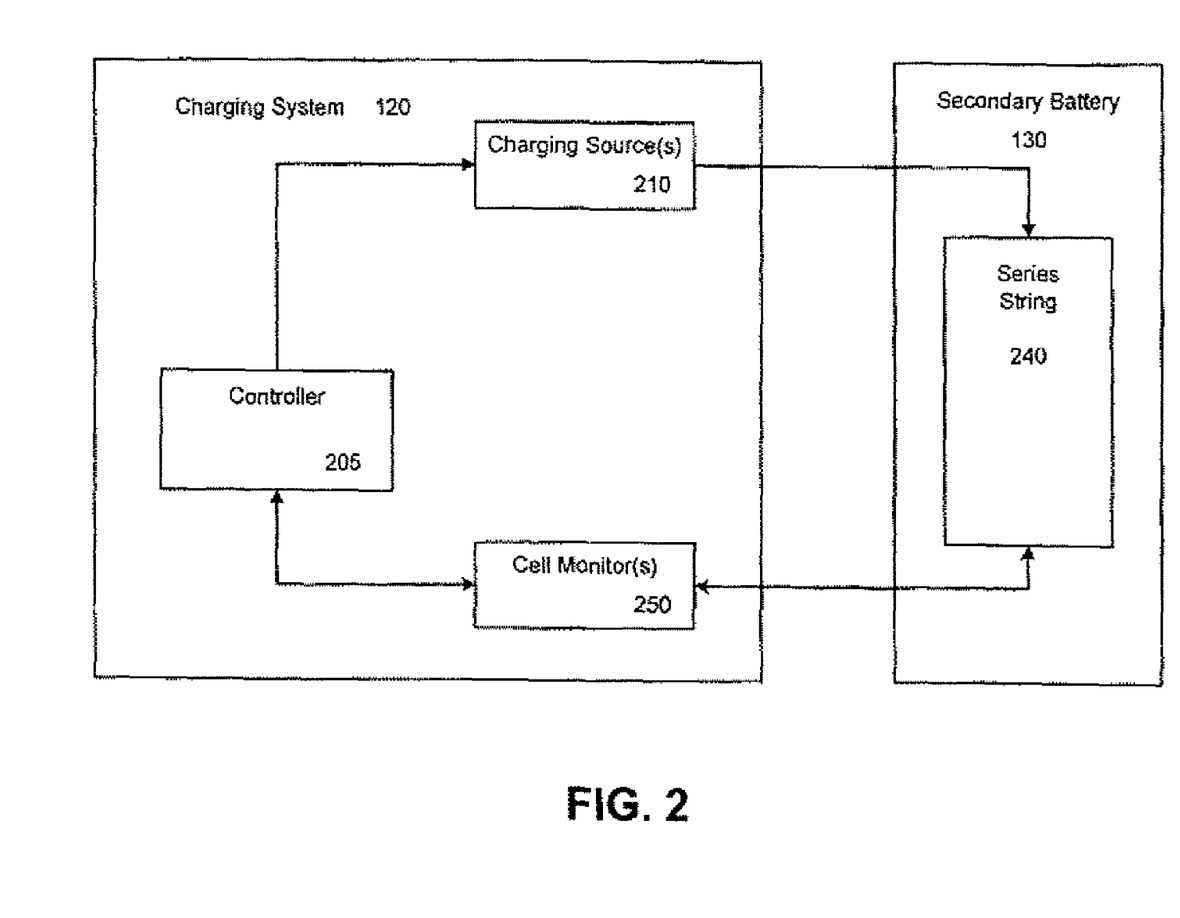
FIG. 2 is a block diagram of an exemplary embodiment of a charging system utilizing cell equalization to charge a secondary battery.

FIG. 2 is a block diagram of an exemplary embodiment of charging system 120 of FIG. 1. Charging system 120, in an exemplary embodiment, includes controller 205, which may be any hardware and/or software suitably configured to switch ON and OFF a charging source. As such, controller 205 may be any controller known in the art capable of switching ON and OFF charging sources when appropriate to do such.

In one exemplary embodiment, controller 205 is connected to charging source(s) 210. Charging source 210 may be any hardware and/or software suitably configured to provide charging current to at least one battery cell when switched ON (i.e., operating in a charging state), and not provide charging current to a battery cell when switched OFF (i.e., operating in a non-charging state). As such, charging source 210 may be any charging source known in the art capable of charging one or more battery cells.

In another exemplary embodiment, charging system 120 includes a series string of battery cells 240 (series string 240). Series string 240, in an exemplary embodiment, includes one or more individual battery cells (not shown), wherein each battery cell voltage is dependent on the cell chemistry. As such, series string 240 may be configured to form a secondary battery of any desired voltage.

Charging system 120, in another exemplary embodiment, includes at least one cell monitor 250 connected to a respective battery cell and controller 205. Cell monitor 250 may be any hardware and/or software suitably configured to monitor the terminal voltage of one or more battery cells. As such, cell monitor 250 may be any cell monitor known in the art capable of detecting the terminal voltage of an individual or plurality of battery cells. In one aspect of the invention, cell monitor 250 may be configured to detect the terminal voltage of a battery cell (with a pre-determined amount of error tolerance). In another aspect of the invention, cell monitor 250 may be configured to determine if a battery cell, with which cell monitor 250 is associated, contains a terminal voltage above or below a pre-determined threshold level. Furthermore, cell monitor 250, in an exemplary embodiment, is configured to communicate the terminal voltage of a battery cell and/or whether the battery cell contains above or below the threshold amount of charge to controller 205. As used herein, the term "above" with reference to a terminal voltage and/or a threshold amount of voltage means substantially the same as or greater than the amount. In addition, the invention contemplates that charging system 120 may be formed on a printed circuit board (PCB) (not shown) or on any other platform known in the art suitable for forming and/or operating charging system 120.

Figure 3:
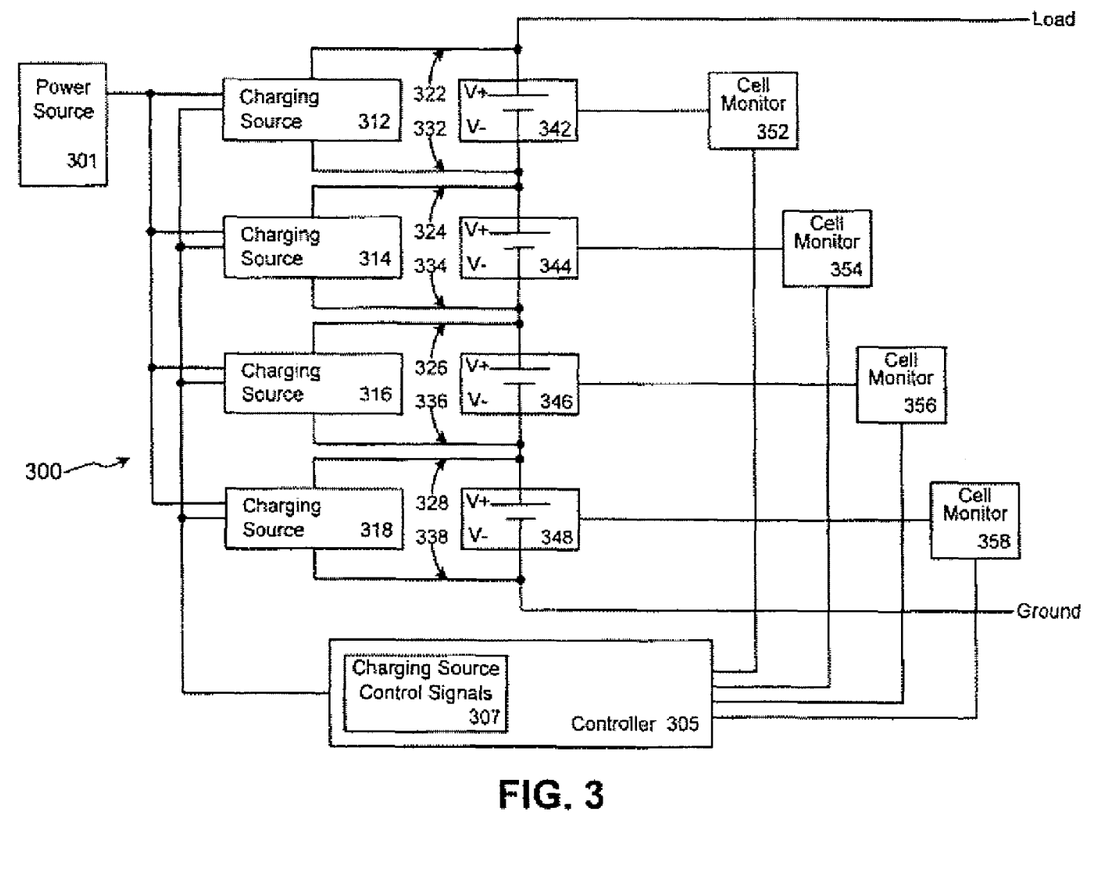
FIG. 3 is a block diagram of one exemplary embodiment of a topology of the charging system of FIG. 2.

FIG. 3 is a block diagram of one exemplary embodiment of a topology 300 of charging system 120. In an exemplary embodiment, topology 300 includes a power source 301 connected to a charging source 312, a charging source 314, a charging source 316, and a charging source 318. In an exemplary embodiment, power source 301 is configured similar to power source 110 discussed above, and charging sources 312, 314, 316, and 318 are each configured similar to charging source 210 discussed above.

In one exemplary embodiment of the present invention, charging source 312 is connected to battery cell 342 via positive path 322 and negative path 332. In accordance with an aspect of one exemplary embodiment of the present invention, charging source 312 is coupled in parallel to battery cell 342, wherein charging source 312 is coupled to the positive terminal (V+) and negative terminal (V−) of battery cell 342 via positive path 322 and negative path 332, respectively.

In another exemplary embodiment, charging source 314 is connected to battery cell 344 via positive path 324 and negative path 334. In accordance with another aspect of one exemplary embodiment of the present invention, charging source 314 is coupled in parallel to battery cell 344, wherein charging source 314 is coupled to V+ and V− of battery cell 342 via positive path 324 and negative path 334, respectively.

Charging source 316, in an exemplary embodiment, is connected to battery cell 346 via positive path 326 and negative path 336. In accordance with yet another aspect of one exemplary embodiment of the present invention, charging source 316 is coupled in parallel to battery cell 346, wherein charging source 316 is coupled to V+ and V− of battery cell 346 via positive path 326 and negative path 336, respectively.

In still another exemplary embodiment, charging source 318 is connected to battery cell 348 via positive path 328 and negative path 338. In accordance with an aspect of one exemplary embodiment of the present invention, charging source 318 is coupled in parallel to battery cell 348, wherein charging source 318 is coupled to V+ and V− of battery cell 348 via positive path 328 and negative path 338, respectively.

Battery cells 342, 344, 346, and 348, in an exemplary embodiment, are lithium-ion battery cells. In other embodiments, battery cells 342, 344, 346, and 348 may be, but are not limited to, lead-acid battery cells, nickel-cadmium battery cells, nickel-metal hydride battery cells, nickel hydrogen battery cells, silver-zinc battery cells, or any other battery cells capable of storing a charge and subsequently being recharged after discharge. In addition, the invention contemplates that battery cells 342, 344, 346, and 348 may each be any size battery cell known in the art.

Positive paths 322, 324, 326, and 328 may be any hardware and/or device suitably configured to conduct charging current. As such, positive paths 322, 324, 326, and 328 may be formed of any material known in the art capable of conducting charging current supplied from a charging source to a battery cell to charge the battery cell. Negative paths 332, 334, 336, and 338 may also be any hardware and/or device suitably configured to conduct charging current. As such negative paths 332, 334, 336, and 338 may be formed of any material known in the art capable of conducting and/or returning charging current from a battery cell to a charging source.

Charging sources 312, 314, 316, and 318, in one exemplary embodiment, are each connected to a controller 305, wherein controller 305 is configured similar to controller 205 discussed above. Controller 305, in one exemplary embodiment, is configured to transmit charging source control signals 307 to charging sources 3312, 314, 316, and 318 to control the ON/OFF operation of charging sources 312, 314, 316, and 318.

Topology 300, in one exemplary embodiment, also includes a cell monitor 352, a cell monitor 354, a cell monitor 356, and a cell monitor 358, wherein cell monitors 352, 354, 356, and 358 are each configured similar to cell monitor 250 discussed above. In one embodiment, cell monitors 352, 354, 356, and 358 are connected to battery cells 342, 344, 346, and 348, respectively, and are each connected to controller 305. In an exemplary embodiment, cell monitors 352, 354, 356, and 358 are each suitably connected to battery cells 342, 344, 346, and 348 such that cell monitors 352, 354, 356, and 358 are each capable of determining the amount of charge contained within battery cells 342, 344, 346, and 348, respectively. In another exemplary embodiment, cell monitors 352, 354, 356, and 358 are suitably connected to controller 305 such that cell monitors 352, 354, 356, and 358 are capable of communicating the amount of charge (or whether their respective battery cell includes an amount of charge above or below a threshold amount) contained within battery cells 342, 344, 346, and 348, respectively, to controller 305.

Figure 4:
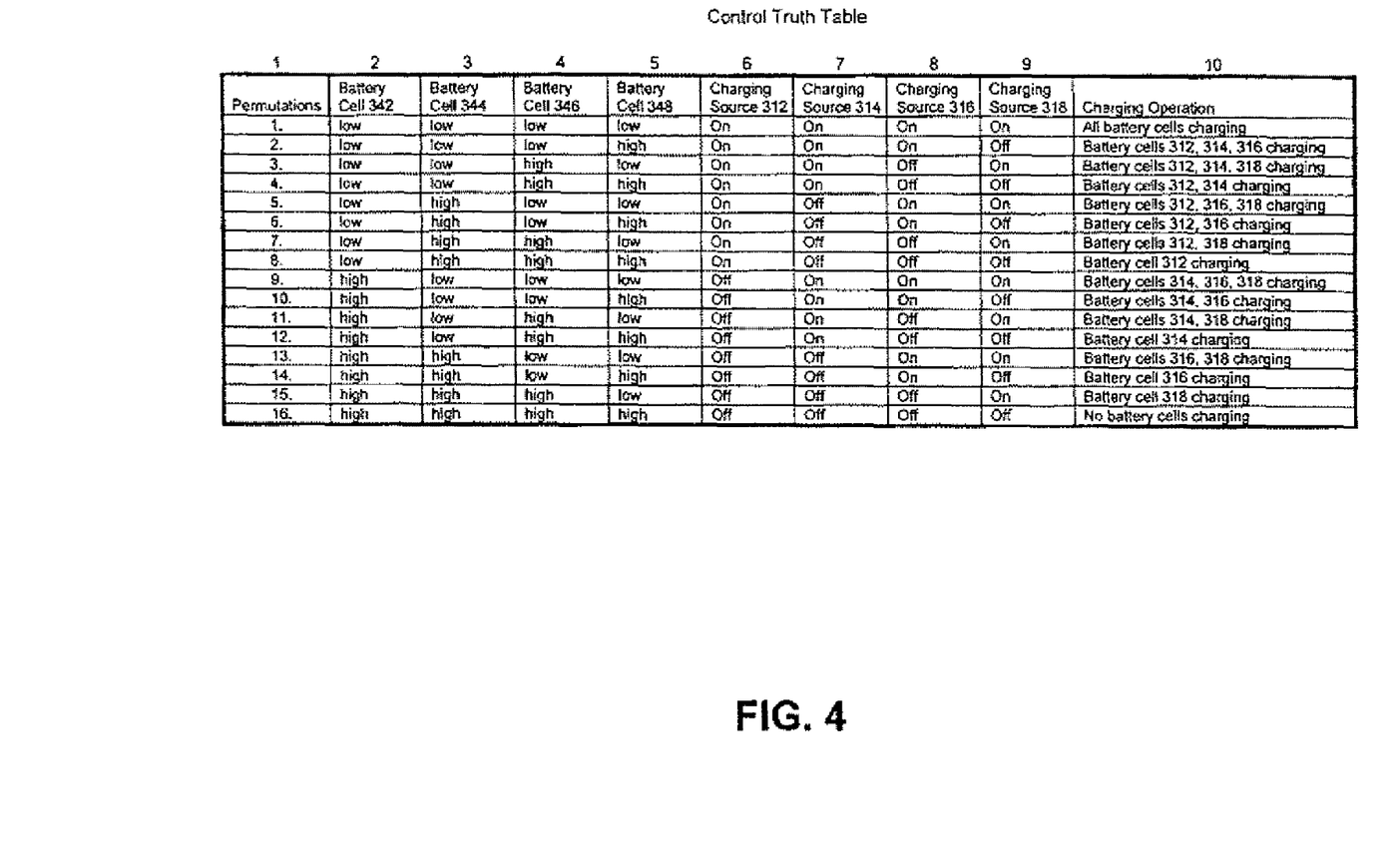
FIG. 4 is a control truth table and operational chart for the topology illustrated in FIG. 3.

FIG. 4 is a control truth table and operational chart for topology 300, as illustrated in FIG. 3. For the exemplary embodiment illustrated in FIG. 3, there are 16 different permutations representing the state of charge of battery cells 342, 344, 346, and 348 during a charging operation. Only a few permutations will be described in detail herein, as doing so will make the other states of the control truth table readily apparent. In the control truth table, column 1 reflects the 16 different possible permutations of the exemplary embodiment of FIG. 3. Columns 2, 3, 4, and 5 indicate the state of charge (i.e., fully charged (high) or not fully charged (low)) of battery cells 342, 344, 346, and 348, respectively. Columns 6, 7, 8, and 9 indicate the state of operation (i.e., ON or OFF) of charging sources 312, 314, 316, and 318, respectively, and column 10 indicates the state of operation of topology 300 (i.e., charging system 120).

In permutation 5, for example, battery cells 342, 346, and 348 are not fully charged and need to be charged, whereas battery cell 344 is fully charged (i.e., the cell voltage is above a threshold amount) and should not be further charged (i.e., over-charged). In this situation, charging sources 312, 316, and 318 will be switched ON by controller 305 (whereas charging source 314 will remain switched OFF) to provide charging current to battery cells 342, 346, and 348, respectively. In the case of battery cell 342, charging current is supplied to battery cell 342 from charging source 312, wherein the charging current is supplied through positive path 322 to charge battery cell 342, then returns to charging source 312 via negative path 332 so as not to supply charging current to battery cells 344, 346, and 348. Similarly, in the case of battery cell 346, charging current in supplied to battery cell 346 from charging source 316, wherein the charging current is supplied through positive path 326 to charge battery cell 346, then returns to charging source 316 via negative path 336 so as not to supply charging current to battery cells 342, 344, and 348. Furthermore, in the case of battery cell 348, charging current is supplied to battery cell 348 from charging source 318, wherein the charging current is supplied through positive path 328 to charge battery cell 348, then returns to charging source 318 via negative path 338 so as not to supply charging current to battery cells 342, 344, and 346.

Permutation 10 is another example of how topology 300 provides charging current to battery cells needing to be charged, but yet does not provide charging current to battery cells fully charged or have a cell voltage above a threshold amount. In this example, battery cells 344 and 346 need to be charged, whereas battery cells 342 and 348 are fully charged (i.e., a cell voltage above a threshold amount) and should not be further charged (i.e., over-charged). As such, charging sources 314 and 316 are switched ON by controller 305 (whereas charging sources 312 and 318 will remain switched OFF) to provide charging current to battery cells 344 and 346, respectively. In the case of battery cell 344, charging current is supplied to battery cell 344 from charging source 314, wherein the charging current is supplied through positive path 324 to charge battery cell 344, then returns to charging source 314 via negative path 334 so as not to supply charging current to battery cells 342, 346, and 348. Likewise, in the case of battery cell 346, charging current is supplied to battery cell 346 from charging source 316, wherein the charging current is supplied through positive path 326 to charge battery cell 346, then returns to charging source 316 via negative path 336 so as not to supply charging current to battery cells 342, 344, and 348.

Permutation 15 illustrates the example of when only one battery cell (i.e., battery cell 318) requires charging. In this example, controller 305 switches ON charging source 318 such that charging current will flow from charging source 318 via positive path 328 to battery cell 348, and return to charging source 318 via negative path 338. As such, battery cells 312, 314, and 316 do not receive charging current since they are fully charged and/or charged above the minimum threshold voltage amount.

The remaining permutations (i.e., permutations 1-4, 6-9, 11-14, and 16) may be analyzed in a manner similar to permutations 5, 10, and 15. Furthermore, the invention contemplates that charging system 120 may include any number of battery cells in series string 240, and corresponding charging sources and cell monitors without departing from the spirit and scope of the invention. In addition, negative path 338 may be omitted since charging current leaving battery cell 348 will not charge any other battery cell, but will instead, flow to ground.

Figure 5:
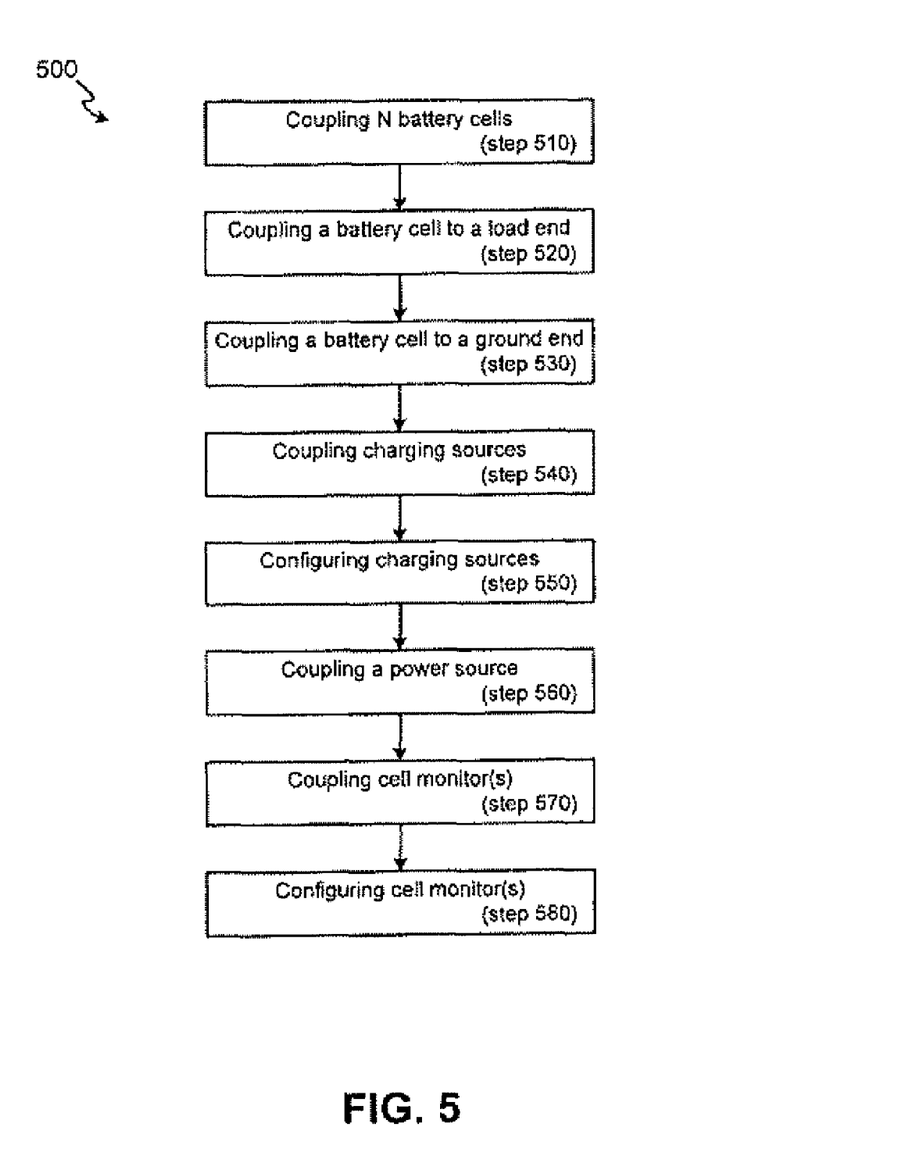
FIG. 5 is a flow diagram of an exemplary embodiment of a method for charging a secondary battery utilizing cell equalization.

FIG. 5 is a flow diagram of an exemplary embodiment of a method 500 for charging a secondary battery utilizing cell equalization. In accordance with an exemplary embodiment, method 500 initiates by coupling N battery cells (e.g., battery cells 342, 244, 246, and 348) in series to form a series string (e.g., series string 240) on a platform (step 510). In one exemplary embodiment, the step of coupling N battery cells includes coupling a different battery cell to a load end (step 520), and coupling a battery cell to a ground end (step 530).

In accordance with an exemplary embodiment, method 500 also includes coupling a plurality of charging sources (e.g., charging sources 312, 214, 316, and 318) in parallel to the N battery cells (step 540). In accordance with an aspect of one exemplary embodiment of the present invention, coupling the plurality of charging sources in parallel includes coupling each charging source to a respective battery cell via a positive path (e.g., positive path 322) and a negative path (e.g., negative path 332).

Method 500, in accordance with an exemplary embodiment, includes configuring each charging source to selectively provide charging current to a single battery cell in series string 240 (step 550). In accordance with an aspect of one exemplary embodiment of the present invention, configuring each charging source may include configuring each charging source to provide charging current to each battery cell containing an amount of voltage below a threshold amount, and not provide charging current to each cell containing an amount of voltage above the threshold amount. In accordance with another aspect of one exemplary embodiment of the present invention, configuring each charging source may include configuring each charging source to operate in a charging state to provide charging current to a respective battery cell, and configuring each charging source to operate in a non-charging state to not provide charging current to the battery cell.

In another exemplary embodiment, method 500 includes coupling each charging source to a power source (e.g., power source 110) to provide power to each charging source (step 560). In yet another embodiment, method 500 includes coupling a cell monitor to each battery cell to monitor the voltage level of each of battery cell (step 570). Method 500, in still another embodiment, includes configuring the cell monitors to determine which battery cell(s) contain an amount of voltage above and/or below the threshold amount (step 580).

Figure 6:
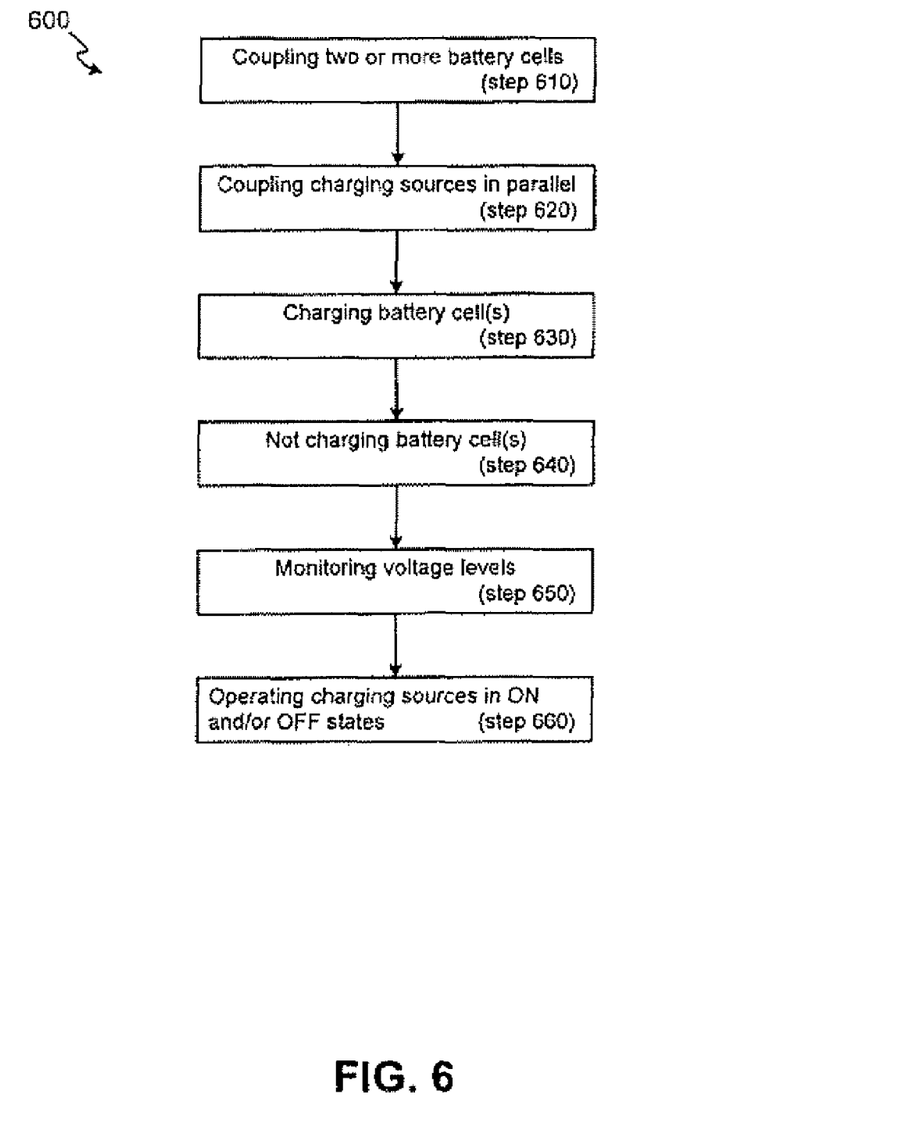
FIG. 6 is a flow diagram of one exemplary embodiment of a method for equalizing the voltage of a secondary battery being charged.

FIG. 6 is a flow diagram of another exemplary embodiment of a method 600 for equalizing the voltage of a secondary battery being charged including coupling two or more battery cells (e.g., battery cells 342, 344, 346. and 348) in series to form a series string (e.g., series string 240) (step 610). In one exemplary embodiment, method 600 includes coupling a charging source (e.g., charging source 312) in parallel across each battery cell (step 620). Method 600, in another exemplary embodiment, includes charging any battery cell(s) containing an amount of voltage below a threshold level (step 630), and not charging any battery cell(s) containing an amount of voltage above the threshold level (step 640). In accordance with another aspect of the present invention, charging a battery cell may include providing charging current to a particular battery cell via a charging source coupled in parallel to the battery cell. In accordance with another aspect of one exemplary embodiment of the present invention, charging a battery cell may include switching ON a charging source to charge a particular battery cell needing to be charged, and switching OFF the charging source to stop charging the battery cell when it contains a voltage level above the threshold amount.

In one exemplary embodiment, method 600 also includes monitoring the voltage level of battery cell in the series string (step 650). In another embodiment, method 600 includes operating each charging source independently in an ON state or in an OFF state based on the voltage level of a battery cell connected to the charging source (step 660).

Benefits, advantages and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of the invention. All structural and functional equivalents to the elements of the above-described exemplary embodiments that are known to those of ordinary skill in the art are expressly incorporated herein by reference. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A charging system for charging a rechargeable battery connected to a load, comprising:
   N battery cells coupled in series forming a series string, wherein said series string comprises:
   a first battery cell coupled to the load, and
   an $N^{th}$ battery cell coupled to a ground of the load;
   a plurality of isolated charging sources, each isolated charging source being coupled to a power source and coupled in parallel to one of the battery cells of said series string, wherein each isolated charging source is configured to operate in one of a first state and a second state, wherein when operating in said first state the isolated charging source provides charging current to said respective battery cell, and when operating in said second state, the isolated charging source does not provide charging current to said respective battery cell;
   a plurality of positive paths coupled to said series string and said isolated charging sources; and
   a plurality of negative paths coupled to said series string and said isolated charging sources, wherein each of the isolated charging sources are coupled in parallel to one of the respective battery cells via a respective positive path of the plurality of positive paths and a respective negative path of the plurality of negative paths, and wherein a ground of the power source is isolated from the ground of the load.

2. The charging system of claim 1, wherein each isolated charging source is configured to provide charging current to each respective battery cell via said positive path, and return charging current to said isolated charging source via said negative path, and wherein each isolated charging source comprises a DC to DC converter configured as a constant voltage source for cell equalization.

3. The charging system of claim 1, further comprising:
   a controller, where said controller is coupled to each of said isolated charging sources.

4. The charging system of claim 3, wherein said controller is configured to selectively operate each isolated charging source in one of said first state and said second state.

5. The charging system of claim 1, further comprising:
   a plurality of cell monitors coupled to said series string, wherein each cell monitor is coupled to a respective battery cell, and is configured to measure a voltage of the respective battery cell; and
   a controller coupled to each cell monitor and coupled to each isolated charging source, wherein said isolated charging sources are controlled by said controller to provide charging current to their respective battery cells when said battery cell has a voltage less than a threshold amount, and to not provide charging current to said battery cell when said battery cell has a voltage equal to or greater than said threshold amount.

6. A method for cell equalization of a secondary battery being charged, the method comprising the steps of:
   coupling N battery cells in series to form a series string, wherein said coupling N battery cells step comprises the steps of:
   coupling a first cell to a load, and
   coupling an $N^{th}$ battery cell to a ground of the load;
   coupling a plurality of isolated charging sources to said series string, wherein each isolated charging source is coupled in parallel across one of said N battery cells;
   coupling each of the plurality of isolated charging sources to a power source, wherein a ground of the power source is isolated from the ground of the load; and configuring said isolated charging sources to operate either in a first state to provide charging current to said battery cell or in a second state to not provide charging current to said battery cell to selectively provide charging current to one or more of said N battery cells, wherein each of the isolated charging sources comprises a DC to DC converter for providing a constant voltage during cell equalization.

7. The method of claim 6, wherein said configuring said isolated charging sources step comprises the steps of:
configuring a particular isolated charging source to operate in a first state to provide charging current to said respective battery cell; and
configuring each isolated charging source to operate in a second state to not provide charging current to said one or more of said N battery cells.

8. The method of claim 6, further comprising the steps of:
configuring said isolated charging sources to provide charging current to each battery cell having a voltage less than a threshold amount, and to not provide charging current to each battery cell having a voltage equal to or greater than said threshold amount.

9. The method of claim 8, further comprising the steps of:
coupling a plurality of cell monitors to said series string to monitor a voltage of each of said N battery cells, determine which of said N battery cells has a voltage greater than or equal to said threshold amount, and determine which of said N battery cells has a voltage less than said threshold amount.

10. A method for equalizing the cell voltage of a secondary battery comprising the steps of:
coupling two or more battery cells in series to form a series string, wherein one of the battery cells is coupled to a load and another of the battery cells is coupled to a ground of the load;
coupling in parallel across each battery cell an associated isolated charging source, each of said isolated charging sources connected to a power source, wherein a ground of the power source is isolated from the ground of the load;
configuring said associated isolated charging source to operate either in a first state to provide a charging current to said battery cell or in a second state to not provide a charging current to said battery cell, wherein each isolated charging source is configured to operate as a constant voltage source during cell equalization;
providing a charging current to any battery cell having a voltage less than a threshold level with a respective associated isolated charging source;
not providing the charging current to any battery cell having a voltage equal to or greater than said threshold level; and
providing a constant voltage to each of the two or more battery cells via the associated isolated charging sources.

11. The method of claim 10, wherein said step of providing a charging current to comprises the steps of:
switching ON the respective isolated charging source to provide the charging current to the associated battery cell having a voltage less than said threshold level; and
switching OFF said respective isolated charging source to avoid overcharging said associated battery cell when said associated battery cell has a voltage greater than said threshold level.

12. The method of claim 10, further comprising the steps of:
monitoring a respective voltage level of each of said battery cells; and
independently operating each of said isolated charging sources in an ON state or an OFF state based on said respective voltage level of each of said battery cells.

13. The method of claim 10, wherein said step of providing a charging current to a battery cell further comprises the step of:
returning said charging current to said respective associated isolated charging source via a negative path.

14. The method of claim 10, further comprising the steps of:
monitoring a respective voltage of each of said N battery cells;
determining which of said N battery cells has a voltage greater than or equal to said threshold level; and
determining which of said N battery cells has a voltage less than said threshold level.

* * * * *